United States Patent
Shi

(10) Patent No.: US 8,147,138 B2
(45) Date of Patent: Apr. 3, 2012

(54) POWER SUPPLY CIRCUIT FOR MOTHERBOARD

(75) Inventor: Lei Shi, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 912 days.

(21) Appl. No.: 12/185,134

(22) Filed: Aug. 4, 2008

(65) Prior Publication Data

US 2010/0001589 A1    Jan. 7, 2010

(30) Foreign Application Priority Data

Jul. 1, 2008 (CN) .......................... 2008 1 0302478

(51) Int. Cl.
*G06F 1/26* (2006.01)
(52) U.S. Cl. ...................................... 374/208; 713/300
(58) Field of Classification Search .......... 374/208–209; 713/300; 257/724
See application file for complete search history.

(56) References Cited

U.S. PATENT DOCUMENTS

| | | | | |
|---|---|---|---|---|
| 3,851,528 A * | 12/1974 | Nichols et al. | ................. | 374/178 |
| 4,165,642 A * | 8/1979 | Lipp | ............................... | 374/170 |
| 5,961,215 A * | 10/1999 | Lee et al. | ....................... | 374/178 |
| 6,043,718 A * | 3/2000 | Diniz et al. | ...................... | 331/57 |
| 6,078,208 A * | 6/2000 | Nolan et al. | ................... | 327/512 |
| 6,217,213 B1 * | 4/2001 | Curry et al. | .................... | 374/178 |
| 6,885,225 B2 * | 4/2005 | Ohmichi et al. | ............... | 327/112 |
| 6,991,369 B1 * | 1/2006 | Garavan | ........................ | 374/178 |
| 7,210,054 B2 * | 4/2007 | Jahagirdar et al. | ............ | 713/502 |
| 7,690,843 B2 * | 4/2010 | Bowden et al. | ............... | 374/170 |
| 7,877,222 B2 * | 1/2011 | Boerstler et al. | .............. | 702/132 |
| 2009/0319809 A1 * | 12/2009 | Shi | ................................ | 713/300 |

\* cited by examiner

*Primary Examiner* — Lisa Caputo
*Assistant Examiner* — Tania Courson
(74) *Attorney, Agent, or Firm* — Altis Law Group, Inc.

(57) ABSTRACT

An exemplary power supply circuit for a motherboard includes a control circuit, a self-locking circuit, and an unlocking circuit. The control circuit is configured for receiving a working mode signal. The self-locking circuit is arranged to receive a power ok signal and a power supply on signal from a power supply, and is connected to the control circuit and a standby power. The unlocking circuit is connected to the control circuit, the self-locking circuit and the standby power, and is also arranged to receive the power ok signal. When the motherboard is placed in an energy-saving mode, the unlocking circuit unlocks the standby power from the motherboard when the computer is turned off to achieve energy savings.

9 Claims, 1 Drawing Sheet

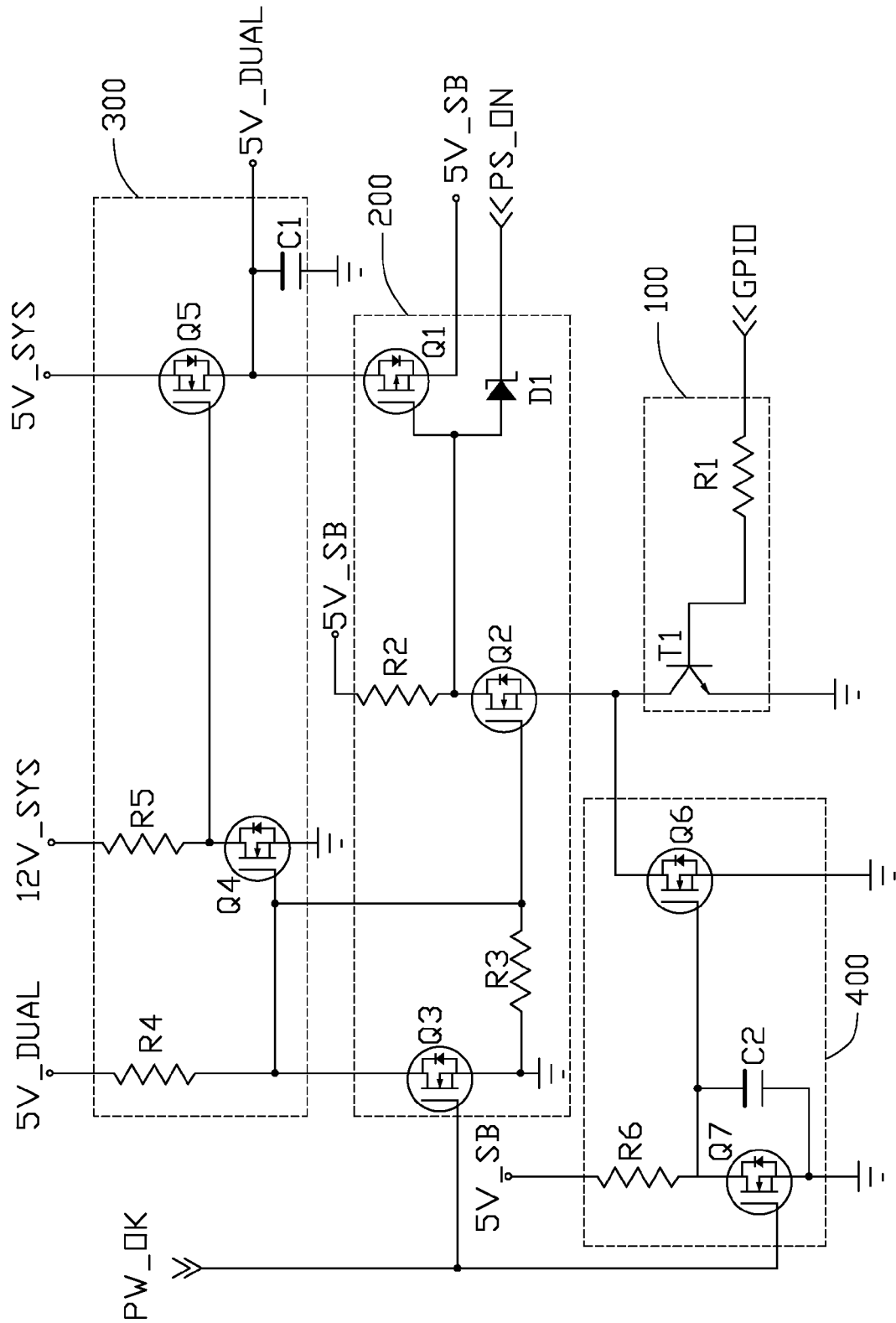

POWER SUPPLY CIRCUIT FOR MOTHERBOARD

BACKGROUND

1. Field of the Invention

The present invention relates to power supply circuits and, particularly, to a power supply circuit for a motherboard.

2. Description of the Related Art

A typical microprocessor-cored computer system, such as a personal computer or a workstation computer, is turned on and off by a switch device that mechanically connects and disconnects a power supply of the computer system to and from an external power source, such as AC 110V. The power supply is connected to the external power source and transforms the external voltage level of the power source into a predetermined DC level, such as +3.3V, +/−5V and +/−12V, to let the computer system to perform various programs and functions.

The power supply for a computer system mainly includes ATX power supply and BTX power supply. A motherboard of a computer can be coupled to the ATX power supply via a 20-pin ATX power connector and two 4-pin ATX power connectors. The ATX power supply provides a standby power 5V_SB, a system power 5V_SYS, a power supply on (PS_ON) signal, and a power ok (PW_OK) signal. When the ATX power supply is turned on, the PS_ON signal is at a low voltage level, and the PW_OK signal is at a high voltage level, but there is a delay of 100-500 ms for the other voltages. When the ATX power supply is turned off or put on stand by, the system power 5V_SYS is turned off, but the standby power 5V_SB is still provided.

BRIEF DESCRIPTION OF THE DRAWING

The drawing is a circuit diagram of a power supply circuit for a motherboard in accordance with an embodiment of the present invention.

DETAILED DESCRIPTION

Referring to the drawing, a power supply circuit for a motherboard in accordance with an embodiment of the present invention includes a control circuit 100, a self-locking circuit 200, a voltage shifting circuit 300, and an unlocking circuit 400.

The control circuit 100 includes a negative-positive-negative (NPN) transistor T1 and a resistor R1. The base of the NPN transistor T1 is connected to a general purpose input and output (GPIO) terminal of the basic input and output system (BIOS) of a computer via the resistor R1. The collector of the NPN transistor T1 is connected to the self-locking circuit 200 and the unlocking circuit 400, and the emitter of the NPN transistor T1 is grounded.

The self-locking circuit 200 includes a zener diode D1, a P type metal oxide semiconductor (PMOS) transistor Q1, two N type metal oxide semiconductor (NMOS) transistors Q2 and Q3, and two resistors R1 and R2. The gate of the PMOS transistor Q1 is connected to the drain of the NMOS transistor Q2 and the anode of the zener diode D1. The cathode of the zener diode D1 is arranged to receive a power supply on (PS_ON) signal from the power supply. The drain of the PMOS transistor Q1, functioning as a voltage output terminal 5V_DUAL, is connected to the voltage shifting voltage 300. The source of the PMOS transistor Q1 is arranged to receive a standby power 5V_SB. The gate of the NMOS transistor Q2 is connected to the drain of the NMOS transistor Q3 and grounded via the resistor R3. The drain of the NMOS transistor Q2 is arranged to receive the standby power 5V_SB via the resistor R2, and the source of the NMOS transistor Q2 is connected to the collector of the NPN transistor T1. The gate of the NMOS transistor Q3 is arranged to receive a power ok (PW_OK) signal from the power supply. The drain of the NMOS transistor Q3 is connected to the voltage shifting circuit 300, and the source of the NMOS transistor Q3 is grounded.

The voltage shifting circuit 300 includes a capacitor C1, two resistors R4 and R5, and two NMOS transistors Q4 and Q5. The gate of the NMOS transistor Q4 is connected to the drain of the NMOS transistor Q3, as well as the voltage output terminal 5V_DUAL via the resistor R4. The drain of the NMOS transistor Q4 is arranged to receive a system power 12V_SYS via the resistor R5, and connected to the gate of the NMOS transistor Q5. The source of the NMOS transistor Q4 is grounded. The drain of the NMOS transistor Q5 is connected to the voltage output terminal 5V_DUAL and the anode of the capacitor C1, wherein the cathode of the capacitor C1 is grounded. The source of the NMOS transistor Q5 is arranged to receive a system power 5V_SYS.

The unlocking circuit 400 includes a resistor R6, a capacitor C2, and two NMOS transistors Q6 and Q7. The gate of the NMOS transistor Q7 is arranged to receive the PW_OK signal from the power supply. The drain of the NMOS transistor Q7 is arranged to receive the standby power 5V_SB via the resister R6, and connected to the anode of the capacitor C2. The source of the NMOS transistor Q7 is connected to the cathode of the capacitor C2 and is grounded. The gate of the NMOS transistor Q6 is connected to the drain of the NMOS transistor Q7. The drain of the NMOS transistor Q6 is connected to the control circuit 100 and the self-locking circuit 200, and the source of the NMOS transistor Q6 is grounded.

The present invention provides two working modes for the motherboard, which are named energy-saving mode and suspend mode. The two working modes are set by the BIOS when the computer is turned on. The BIOS controls the GPIO terminal to output a variable working mode signal according to the selected working mode. If the motherboard is placed in the energy-saving mode, the motherboard does not consume any power when the computer is turned off, and there is no signal output from the control circuit 100 in response to the working mode signal. If the motherboard is placed in the suspend mode, the motherboard can be woken up at any time when the computer is turned off, and there is a signal output from the control circuit 100 in response to a working mode signal.

When the motherboard is put in the energy-saving mode, the BIOS outputs the working mode signal from the GPIO at a low voltage level to turn off the NPN transistor T1. The PS_ON signal is at a low voltage level when the computer is turned on, and as a result, the PMOS transistor Q1 is turned on via the zener diode D1. The voltage output terminal 5V_DUAL outputs the standby power 5V_SB. At the moment the computer is turned on, the PW_OK signal is still at a low voltage level because there is a delay for the arrival of all the voltages on the motherboard. Therefore, the NMOS transistors Q3 and Q7 are turned off, and the NMOS transistors Q2 and Q6 are turned on. The gate of the PMOS transistor Q1 is grounded via the NMOS transistors Q2 and Q6. Thus, the voltage output terminal 5V_DUAL outputs the standby power 5V_SB continuously, which means that the self-locking circuit 200 locks the standby power 5V_SB for the voltage output terminal 5V_DUAL. 100-500 ms later, the PW_OK signal is at a high voltage level. Therefore, the NMOS transistors Q3 and Q7 are turned on, and the NMOS transistors Q2 and Q6 are turned off. The gate of the PMOS transistor Q1 is at a high voltage level. Thus, the PMOS transistor Q1 is turned off, and the voltage output terminal 5V_DUAL no longer outputs the standby power 5V_SB. However, the gate of the NMOS transistor Q4 is grounded via the NMOS transistor Q3, thus, the NMOS transistors Q4 is turned off and the NMOS transistor Q5 is turn on. Subsequently, the voltage output terminal 5V_DUAL outputs the system power 5V_SYS.

When the computer is turned off, the PW_OK signal becomes a low voltage level signal to turn off the NMOS transistors Q3 and Q7. At the moment when the computer is turned off, some voltage still remains at the voltage output terminal 5V_DUAL to turn on the NMOS transistor Q4, and turn off the NMOS transistor Q5. Thus, the voltage output terminal 5V_DUAL no longer outputs the system power 5V_SYS. The NMOS transistor Q6 is turned on after an RC delay caused by the resistor R6 and the capacitor C2. At the moment there is almost no voltage at the voltage output terminal 5V_DUAL. The NMOS transistor Q2, whose gate is grounded via the resistor R3, is turned off. Therefore, the PMOS transistor Q1 is turned off, and the standby power 5V_SB cannot be sent to the voltage output terminal 5V_DUAL. As a result, the unlocking circuit 400 unlocks the standby power 5V_SB from the motherboard to achieve energy savings.

When the motherboard is put in the suspend mode, the BIOS outputs the working mode signal output from the GPIO at a high voltage level to turn on the NPN transistor T1. Therefore, the source of the NMOS transistor Q2 is always grounded. At the moment when the computer is turned off, some voltage still remains at the voltage output terminal 5V_DUAL for the power storage capability of the capacitor C1, and the NMOS transistor Q2 is turned on via the resistor R4. Thus, the voltage output terminal 5V_DUAL outputs the standby power 5V_SB via the resistor R2, the NMOS transistor Q2, and the resistor R4. The motherboard can be woken up at any time when the computer is turned off.

In the present embodiment, the PMOS transistor Q1, the NMOS transistors Q2, Q6 and Q7, functioning as switches, control the voltage output terminal 5V_DUAL to output the standby power 5V_SB or not, thereby to achieve energy savings. The PMOS transistor Q1, the NMOS transistors Q2, Q6 and Q7 also can be replaced by other switches selectively, such as NPN transistors, PNP transistors and the like.

In another embodiment, the control circuit 100 can be canceled. The power supply circuit for the motherboard only includes the self-locking circuit 200, the voltage shifting circuit 300, and the unlocking circuit 400. The motherboard directly enters the energy-saving mode when the computer is turned off.

The foregoing description of the exemplary embodiments of the invention has been presented only for the purposes of illustration and description and is not intended to be exhaustive or to limit the invention to the precise forms disclosed. Many modifications and variations are possible in light of the above teaching. The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A power supply circuit for a motherboard, comprising:
   a control circuit configured for receiving a working mode signal;
   a self-locking circuit comprising:
      a first switch comprising a control terminal receiving a power supply on signal from a power supply, a power terminal connected to a standby power, and a voltage output terminal; and
      a second switch comprising a control terminal connected to the voltage output terminal of the first switch, a power terminal connected to the control terminal of the first switch and the standby power, and an output terminal connected to the control circuit; and
   an unlocking circuit comprising:
      a delay circuit connected to the standby power;
      a third switch comprising a control terminal connected to the delay circuit, a power terminal connected to the output terminal of the second switch and the control circuit, and a grounded terminal; and
      a fourth switch comprising a control terminal receiving a power ok signal from the power supply, a power terminal connected to the delay circuit, and a grounded terminal;
   wherein upon the condition that the motherboard is placed in an energy-saving mode, there is no signal output from the control circuit in response to the working mode signal; when the computer is turned off, the power ok signal is at a low voltage level to turn off the fourth switch, the third switch is turned on after a delay of the delay circuit, there is no voltage at the voltage output terminal, and the second switch and the first switch are turned off, thereby the standby power cannot be sent to the voltage output terminal.

2. The power supply circuit as claimed in claim 1, wherein the control circuit comprises a negative-positive-negative (NPN) transistor comprising:
   a base connected to a general purpose input and output (GPIO) terminal of the basic input and output system (BIOS) of a computer to receive the working mode signal;
   a collector connected to the output terminal of the second switch and the power terminal of the third switch; and
   an emitter that is grounded;
   wherein upon the condition that the motherboard is placed in the energy-saving mode, the working mode signal output from the GPIO terminal is at a low voltage level, and the NPN transistor is turned off.

3. The power supply circuit as claimed in claim 1, wherein the first switch is a P type metal oxide semiconductor (PMOS) transistor, the control, power, and voltage output terminals of the first switch are gate, source, and drain of the PMOS transistor respectively, and the second switch is an N type metal oxide semiconductor (NMOS) transistor, the control, power, and output terminals of the second switch are gate, drain, and source of the NMOS transistor respectively;
   the gate of the PMOS transistor receives the power supply on signal from the power supply via a zener diode, the zenzer diode comprising:
      a diode anode connected to the gate of the PMOS transistor; and
      a diode cathode connected to the power supply to receive the power supply on signal;
   the gate of the NMOS transistor is connected to the voltage output terminal via a first resistor, and grounded via a second resistor;

the source of the NMOS transistor is connected to the power terminal of the third switch and the control circuit; and the drain of the NMOS transistor is connected to the gate of the PMOS transistor, and arranged to receive the standby power via a third resistor.

4. The power supply circuit as claimed in claim 1, wherein the delay circuit comprises:
   a resistor connected between the standby power and the control terminal of the third switch; and
   a capacitor comprising:
      a capacitor anode connected to the standby power via the resistor; and
      a capacitor cathode that is grounded.

5. The power supply circuit as claimed in claim 1, wherein the third switch and the fourth switch are NMOS transistors, the control, power, and grounded terminals of each of the third and fourth switches are gate, drain, and source of the NMOS transistor respectively; the gate of the third switch receives the standby power via the delay circuit.

6. A power supply circuit for a motherboard, comprising:
   a self-locking circuit comprising:
      a first switch comprising a control terminal receiving a power supply on signal from a power supply, a power terminal connected to a standby power, and a voltage output terminal; and
      a second switch comprising a control terminal connected to the voltage output terminal of the first switch, a power terminal connected to the control terminal of the first switch and the standby power, and an output terminal; and
   an unlocking circuit comprising:
      a delay circuit connected to the standby power;
      a third switch comprising a control terminal connected to the delay circuit, a power terminal connected to the output terminal of the second switch, and a grounded terminal; and
      a fourth switch comprising a control terminal receiving a power ok signal from the power supply, a power terminal connected to the delay circuit, and a grounded terminal;
   wherein upon the condition that the computer is turned off, the power ok signal is at a low voltage level to turn off the fourth switch; the third switch is turned on after a delay of the delay circuit, there is no voltage at the voltage output terminal, the second switch and the first switch are turned off, thereby the standby power cannot be sent to the voltage output terminal.

7. The power supply circuit as claimed in claim 6, wherein the first switch is a P type metal oxide semiconductor (PMOS) transistor, the control, power, and voltage output terminals of the first switch are gate, source, and drain of the PMOS transistor respectively, and the second switch is an N type metal oxide semiconductor (NMOS) transistor, the control, power, and output terminals of the second switch are gate, drain, and source of the NMOS transistor respectively; the gate of the PMOS transistor receives the power supply on signal from the power supply via a zener diode, the zenzer diode comprising:
      a diode anode connected to the gate of the PMOS transistor; and
      a diode cathode connected to the power supply to receive the power supply on signal;
   the gate of the NMOS transistor is connected to the voltage output terminal via a first resistor, and grounded via a second resistor;
   the source of the NMOS transistor is connected to the power terminal of the third switch; and
   the drain of the NMOS transistor is connected to the gate of the PMOS transistor, and arranged to receive the standby power via a third resistor.

8. The power supply circuit as claimed in claim 6, wherein the delay circuit comprises:
   a resistor connected between the standby power and the control terminal of the third switch; and
   a capacitor comprising:
      a capacitor anode connected to the standby power via the resistor; and
      a capacitor cathode that is grounded.

9. The power supply circuit as claimed in claim 6, wherein the third switch and the fourth switch are NMOS transistors, the control, power, and grounded terminals of each of the third and fourth switches are gate, drain, and source of the NMOS transistor respectively; the gate of the third switch receives the standby power via the delay circuit.

* * * * *